(12) United States Patent
Brisken

(10) Patent No.: US 12,222,418 B2
(45) Date of Patent: Feb. 11, 2025

(54) AUTOMOTIVE RADAR FOR MAPPING AND LOCALIZATION

(71) Applicant: GM Cruise Holdings LLC, San Francisco, CA (US)

(72) Inventor: Stefan Andreas Brisken, Munich (DE)

(73) Assignee: GM Cruise Holdings LLC, San Francisco, CA (US)

( * ) Notice: Subject to any disclaimer, the term of this patent is extended or adjusted under 35 U.S.C. 154(b) by 492 days.

(21) Appl. No.: 17/520,581

(22) Filed: Nov. 5, 2021

(65) Prior Publication Data

US 2023/0145703 A1    May 11, 2023

(30) Foreign Application Priority Data

Nov. 5, 2021  (EP) .................................... 21206687

(51) Int. Cl.
| | | |
|---|---|---|
| *G01S 13/90* | (2006.01) | |
| *G01S 13/58* | (2006.01) | |
| *G01S 13/931* | (2020.01) | |

(52) U.S. Cl.
CPC .............. *G01S 13/90* (2013.01); *G01S 13/58* (2013.01); *G01S 13/931* (2013.01); *G01S 2013/932* (2020.01); *G01S 2013/93274* (2020.01)

(58) Field of Classification Search
CPC ........ G01S 13/90; G01S 13/58; G01S 13/931; G01S 2013/932; G01S 2013/93274; G01S 7/2955; G01S 13/9029
See application file for complete search history.

(56) References Cited

U.S. PATENT DOCUMENTS

| | | | |
|---|---|---|---|
| 10,359,512 B1* | 7/2019 | Hong | ................... G01S 13/878 |
| 2012/0169532 A1 | 7/2012 | Yamada | |
| 2020/0174115 A1 | 6/2020 | Prados et al. | |
| 2021/0096213 A1* | 4/2021 | Han | ...................... G01S 13/52 |
| 2021/0215817 A1 | 7/2021 | Lee | |

FOREIGN PATENT DOCUMENTS

| | | | |
|---|---|---|---|
| DE | 102017123902 A1 | 4/2019 | |
| EP | 4177635 A1 | 5/2023 | |
| WO | 2004059341 A1 | 7/2004 | |
| WO | WO-2021014686 A1 * | 1/2021 | ............. G01S 13/46 |

OTHER PUBLICATIONS

Machine translation of WO 2021014686 A1 (Year: 2021).*
"Extended European Search Report for European Patent Application No. 21206687.2", Mailed Date: Apr. 21, 2022, 8 pages.
"Response to Communication Pursuant to Rule 69 EPC for European Patent Application No. 21206687.2", Filed Date: Nov. 10, 2023, 13 pages.

* cited by examiner

*Primary Examiner* — Matthew M Barker
(74) *Attorney, Agent, or Firm* — Michael DiCato

(57) ABSTRACT

A vehicle (AV) includes a radar sensor and a hardware logic component. The radar sensor receives a radar return from a driving environment of the vehicle and outputs radar data that is indicative of the return to the hardware logic component. The hardware logic component further receives data indicative of a velocity of the vehicle from a sensor mounted on the vehicle. The hardware logic component is configured to employ synthetic aperture radar (SAR) techniques to compute a three-dimensional position of a point on a surface of an object in the driving environment of the vehicle based upon the radar data and the velocity of the vehicle.

11 Claims, 7 Drawing Sheets

AUTOMOTIVE RADAR FOR MAPPING AND LOCALIZATION

RELATED APPLICATION

This application claims priority to European Patent Application No. EP21206687.2, filed on Nov. 5, 2021, and entitled "AUTOMOTIVE RADAR FOR MAPPING AND LOCALIZATION". The entirety of this application is incorporated herein by reference.

BACKGROUND

An autonomous vehicle (AV) is a motorized vehicle that can operate without human conduction. An exemplary AV includes a plurality of sensor systems, such as, but not limited to, a lidar sensor system, a camera sensor system, and a radar sensor system, amongst others, wherein the AV operates based upon sensor signals output by the sensor systems. For example, a radar system can identify a range from the AV to another vehicle in the driving environment, and the AV can plan and execute a maneuver to traverse the driving environment based upon the identified range to the other vehicle. AVs can further be configured to operate based upon maps of their operational regions that are representative of durable characteristics of such regions. For example, an AV can navigate through an operational region based upon a road map that indicates locations and boundaries of various roads in the region.

A map of an operational region of an AV can be generated based upon sensor data from a sensor mounted on a vehicle that traverses the operational region prior to the AV traveling through the operational region. In an example, a vehicle equipped with a lidar sensor can be driven through the operational region. As the vehicle is driven through the operational region, the lidar sensor outputs lidar data that is indicative of positions of objects in the operational region. These lidar data can be used to form a three-dimensional map of the operational region, and the AV can subsequently be operated in the operational region based upon the three-dimensional map. A lidar sensor can be effectively used to identify three-dimensional positions of objects about the lidar sensor. However, lidar sensors tend to be expensive relative to other sensors, and are unreliable in certain weather conditions (e.g., dense fog, rain, etc.)

SUMMARY

The following is a brief summary of subject matter that is described in greater detail herein. This summary is not intended to be limiting as to the scope of the claims.

Described herein are various technologies pertaining to generating a three-dimensional map of a region based upon output of a radar sensor, and operating an AV within the region based upon the three-dimensional map. With more specificity, described herein are various technologies pertaining to a vehicle-mounted radar sensor that employs synthetic aperture radar (SAR) techniques to identify points on surfaces of objects in a driving environment of the vehicle, wherein the identified points can be included in the three-dimensional map of the driving environment. Conventional radar sensors that do not employ SAR techniques generally do not provide sufficiently high resolution radar data to be suitable for three-dimensional mapping of a driving environment.

In an exemplary embodiment, a vehicle includes a radar sensor. The radar sensor includes a radar antenna that emits a radar signal into the driving environment of the vehicle as the vehicle is moving through the driving environment. The radar sensor receives reflections of the radar signal, called radar returns, from a point on a surface of an object in the driving environment over a period of time. In various embodiments, the radar antenna receives the radar returns. In other embodiments, the radar sensor includes a second radar antenna that receives the radar returns. A hardware logic component included in the radar sensor receives radar data that is indicative of the radar returns (e.g., from an analog-to-digital converter, or ADC, coupled to the radar antenna or the second radar antenna). The hardware logic component is configured to determine a three-dimensional position of the point on the surface of the object based upon the radar data. The hardware logic component can determine a range to the point and/or a velocity of the point relative to the radar sensor based upon the radar data.

In order to identify a three-dimensional position of the point, the hardware logic component is further configured to identify an azimuth and elevation of the point. The hardware logic component is configured to employ SAR techniques to compute the azimuth coordinate of the point. In a non-limiting example, an azimuth angle of the point, $\phi$, relative to a center of a field-of-view (FOV) of the radar antenna, can be computed from the forward velocity of the vehicle and a velocity of vehicle relative to the point, which latter velocity can be determined based upon the radar data. In exemplary embodiments, the hardware logic component receives the data indicating the forward velocity of the vehicle from a sensor mounted on the vehicle. In other exemplary embodiments, the hardware logic component can be configured to compute the forward velocity of the vehicle based upon data output by other sensors on the vehicle. The hardware logic component is configured to compute the azimuth coordinate of the point based upon the velocity of the point relative to the radar sensor, determined based upon the radar data, and the forward velocity of the vehicle.

An elevation angle of the point can be computed based upon angle-of-arrival techniques. By way of example, and not limitation, the radar antenna array can be or include a column of vertically-aligned antennas. In exemplary embodiments, the hardware logic component can determine, based upon time difference of arrival (TDOA) between two antennas in the column of vertically-aligned antennas, an elevation angle of the point.

Responsive to the hardware logic component determining a three-dimensional position of the point, the hardware logic component can update a three-dimensional map of the region to indicate that an object is present at the position of the point. The three-dimensional map of the region can subsequently be employed by an AV in connection with navigating through the region. In a non-limiting example, the AV can be configured to traverse the region while avoiding objects indicated in the three-dimensional map.

In some embodiments, the vehicle that includes the radar antenna array can further include an additional radar antenna that is horizontally offset (e.g., along a forward direction of travel of the vehicle) from the radar antenna array. The hardware logic component can be configured to determine, based upon the radar data and a radar return received from the additional radar antenna, whether a point is representative of a static object or a moving object. By way of example, and not limitation, the hardware logic component can determine that a point is representative of a moving object if an azimuth angle computed based upon the radial velocity of the point does not agree with an azimuth angle computed based upon TDOA between the antenna array and the additional antenna. The hardware logic component can be configured to exclude points that are representative of moving objects from being included in the three-dimensional map (e.g., because moving objects are not expected to be present at a same location in the region at later times).

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Various technologies pertaining to generating a three-dimensional map of a portion of an operating region of a vehicle are described herein. With more particularity, technologies described herein facilitate generating high-resolution radar data pertaining to a driving environment of a vehicle based upon SAR principles. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something and is not intended to indicate a preference.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Figure 1:
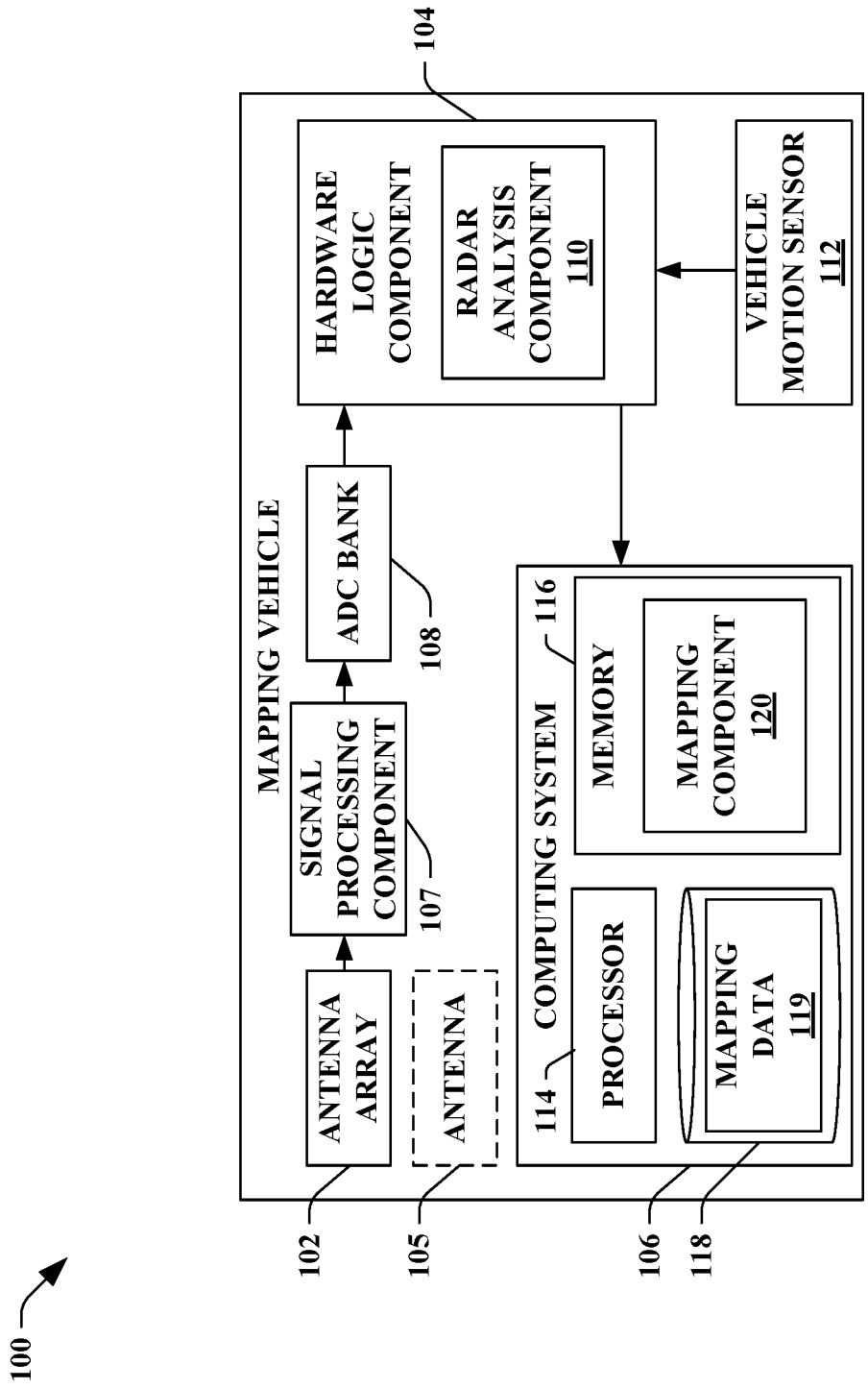
FIG. 1 is a functional block diagram of an exemplary vehicle configured to perform three-dimensional mapping of a driving environment based upon radar.

With reference now to FIG. 1, an exemplary mapping vehicle 100 is illustrated. The mapping vehicle 100 is configured to generate a three-dimensional map of a driving environment in which the mapping vehicle 100 operates. Thus, as the mapping vehicle 100 traverses different portions of an operational region, the mapping vehicle 100 generates a three-dimensional map of the operational region. The three-dimensional map of the operational region includes data indicative of three-dimensional positions of surfaces of objects in the operational region. In a non-limiting example, a three-dimensional map of an operational region that includes a building can include a plurality of points that are each indicative of a position of a point on an exterior surface of the building. Accordingly, the three-dimensional map is representative of positions of objects in the operational region.

The mapping vehicle 100 includes a radar antenna array 102, a hardware logic component 104, and a computing system 106. As will be described in greater detail below, the radar antenna array 102 can be an antenna array having any of various configurations. Furthermore, reference made herein to acts performed by a single radar antenna can also be performed by an array of antennas collectively controlled by way of electronic beamforming techniques. Briefly, the antenna array 102 is configured to emit radar signals into the driving environment of the vehicle 100 and receive radar returns from objects in the driving environment. The hardware logic component 104 is configured to identify positions of object surfaces in the driving environment of the mapping vehicle 100 based upon the radar returns received by the antenna array 102. The computing system 106 is configured to update a three-dimensional map of an operational region of the vehicle 100 based upon the positions of object surfaces identified by the hardware logic component 104.

The antenna array 102 receives radar returns from a driving environment of the mapping vehicle 100. In various exemplary embodiments, the antenna array 102 can be configured as a frequency-modulated continuous wave (FMCW) radar array. In some embodiments, the radar returns received by the antenna array 102 can be reflections of a radar signal output by one or more antennas of the antenna array 102 received from the driving environment. In other embodiments, the mapping vehicle 100 can include a transmit antenna 105. In these embodiments, the transmit antenna 105 can transmit a radar signal into the driving environment of the vehicle 100, and the antenna array 102 can receive reflections of the radar signal transmitted by the transmit antenna 105. It is to be understood that in embodiments wherein the vehicle 100 includes the transmit antenna 105, the vehicle 100 can further include various additional componentry (not shown) that is configured for generating and processing a radar signal that is to be transmitted by way of the transmit antenna 105.

The antenna array 102 outputs electrical signals that are indicative of the radar returns. The electrical signals output by the antenna array 102 are received by a signal processing component 107 that is configured to perform various analog signal processing operations over the electrical signals. By way of example, and not limitation, the signal processing component 107 can include componentry configured to perform various signal processing operations such as filtering, signal conditioning, etc. The processed signals output by the signal processing component 107 are received by an ADC bank 108 that is included on the vehicle 100. The ADC bank 108 is configured to digitally sample the electrical signals output by the antenna array 102 and to output radar data that is indicative of the radar returns received by the antenna array 102. In exemplary embodiments, the hardware logic component 104 receives the radar data from the ADC bank 108. In other embodiments, the ADC bank 108 can be included as a component of the hardware logic component 104. The hardware logic component includes a radar analysis component 110 that computes positions of points on surfaces of objects in the driving environment of the vehicle 100 based upon the radar data output by the ADC bank 108.

Figure 2:
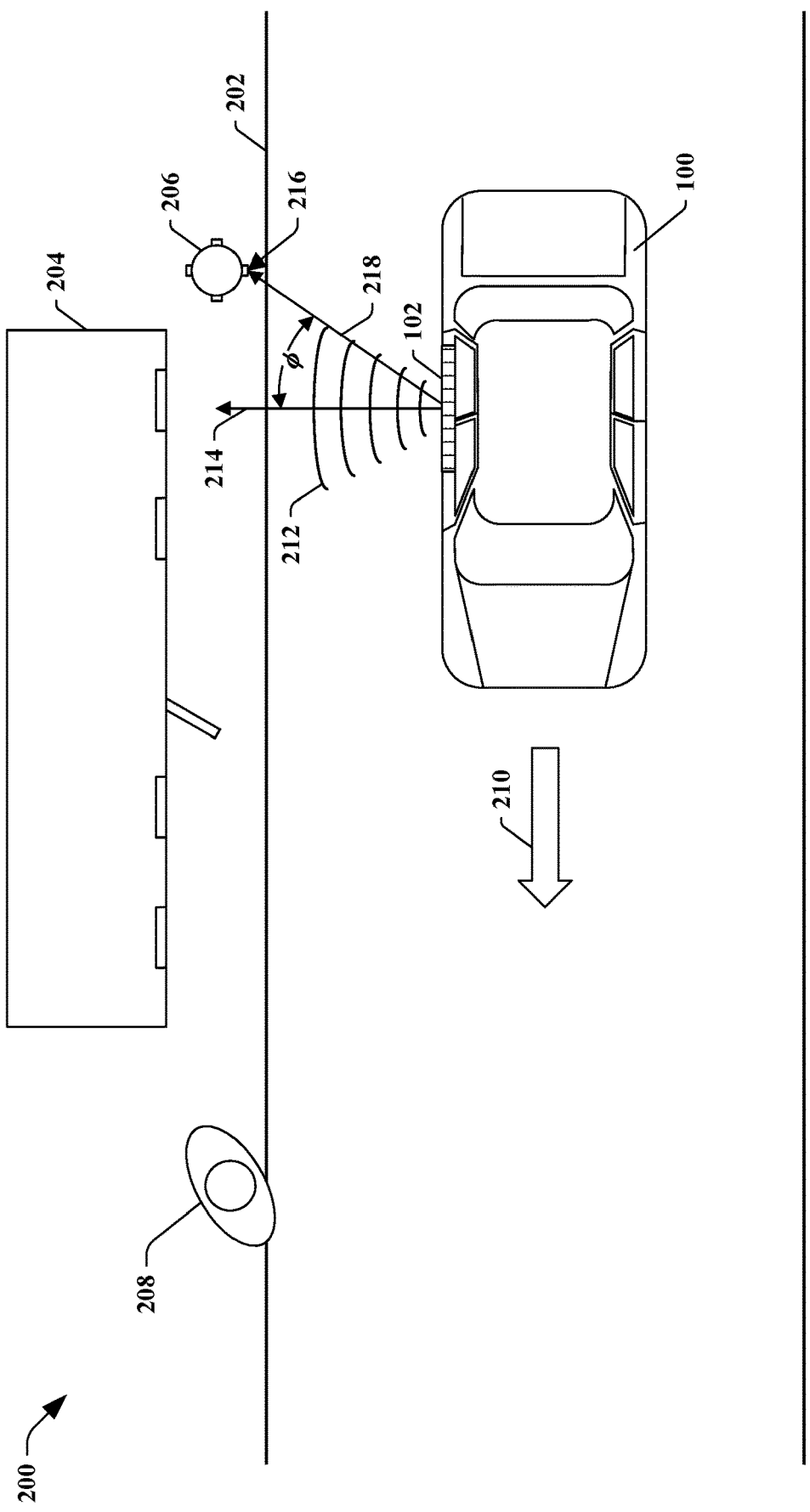
FIG. 2 is a top-down view of an exemplary driving environment of the vehicle of FIG. 1.

The antenna array 102 is configured to emit the radar signals into the driving environment of the vehicle 100 as the vehicle 100 is traveling through the driving environment. Referring now to FIG. 2, an exemplary driving environment 200 of the vehicle 100 is shown. The driving environment 200 includes the vehicle 100 and a roadway 202 on which the vehicle 100 travels. The driving environment 200 further includes a building 204, a hydrant 206, and a pedestrian 208 that are to one side of the roadway 202. The vehicle 100 travels along the roadway 202 in a forward direction 210. The antenna array 102 emits a radar signal 212 into the driving environment 200 at an angle offset from the forward direction 210 of motion of the vehicle 100. In exemplary embodiments the antenna array 102 is positioned such that the radar signal 212 is emitted in a field-of-view FOV centered about a direction 214 that is orthogonal to the forward direction 210 of motion of the vehicle 100. However, it is to be understood that in other embodiments, the FOV of the antenna array 102 can be centered about a direction that is not orthogonal to the forward direction 210 of motion of the vehicle 100. The radar antenna 102 receives returns of the emitted radar signal 212 from the various objects in the driving environment 200 (e.g., the hydrant 206 and the building 204).

The radar analysis component 110 is configured to determine three-dimensional coordinates of points on surfaces of the various objects in the driving environment 200 based upon the radar returns received by the antenna array 102. For example, the radar analysis component 110 can determine three-dimensional coordinates of a point 216 on a surface of the hydrant 206 based upon a return of the radar signal 212 received by the antenna array 102. Various exemplary aspects will be described below with reference to the point 216. However, it is to be understood that these aspects are applicable to substantially any point in a driving environment of the vehicle 100.

The radar analysis component 110 can determine a range to the point 216 based upon the radar return from the point 216. In embodiments wherein the antenna array 102 is configured for FMCW radar, the radar analysis component 110 can determine the range to the point 216 based upon a frequency difference between a reference signal (e.g., which can be a stored copy of the transmitted radar signal 212) and the received radar return. In other embodiments, the radar analysis component 110 can determine the range to the point 216 based upon a time delay between transmission of the radar signal 212 (e.g., a pulsed radar signal) and receipt of the radar return at the antenna array 102.

The radar analysis component 110 can determine an azimuth angle $\phi$ to the point 216, measured relative to the direction 214 about which the FOV of the antenna array 102 is centered, based upon the radar return and the velocity of the vehicle 100 in the forward direction 210 by employing the SAR principle. According to the SAR principle, when the direction 214 of the center of the FOV of the radar antenna 212 is orthogonal to the direction of travel 210 of the vehicle 100, the velocity of the vehicle 100 in the forward direction 210 can be related to the azimuth angle $\phi$ by the following equation:

$$v_{radial} = v_{forward} * \sin(\phi) \qquad \text{Eq. 1}$$

where $v_{radial}$ is the velocity of the antenna array 102 relative to the point 216 along a straight-line direction 218 from the antenna array 102 to the point 216, and $v_{forward}$ is the forward velocity of the vehicle 100. The radar analysis component 110 can determine $v_{radial}$ based upon the radar return received by the antenna array 102. The forward velocity of the vehicle 100, $v_{forward}$, can be determined based upon output of a vehicle motion sensor 112 mounted on the vehicle 100. The vehicle motion sensor 112 can be any of various sensors that output data indicative of a velocity of the vehicle 100, or output data from which the velocity of the vehicle 100 can be determined. In a non-limiting example, the vehicle motion sensor 112 can be or include a speedometer. In other examples, the vehicle motion sensor 112 can be or include an odometer or a GPS sensor. In embodiments wherein the vehicle motion sensor 112 is an odometer or a GPS sensor, the hardware logic component 104 can be configured to compute a velocity of the vehicle 100 based upon traveled distance of the vehicle 100 (e.g., output by the odometer) or a series of positions of the vehicle 100 (e.g., output by the GPS sensor).

By employing Eq. 1, the radar analysis component 110 can determine the azimuth angle $\phi$ to a higher degree of precision than is typically achieved by conventional automotive radar systems. For example, the radar analysis component 110 can determine the azimuth angle $\phi$ to a precision of less than or equal to 0.5°, less than or equal to 0.75°, or less than or equal to 1°. To facilitate computation of the azimuth angle $\phi$ by the radar analysis component 110, the vehicle 100 can be controlled to travel at a speed of at least 5 miles per hour, at least 10 miles per hour, or at least 20 miles per hour in the forward direction 210 during transmission of the radar signal 212 and receipt of its returns from the driving environment 200.

Figure 3:
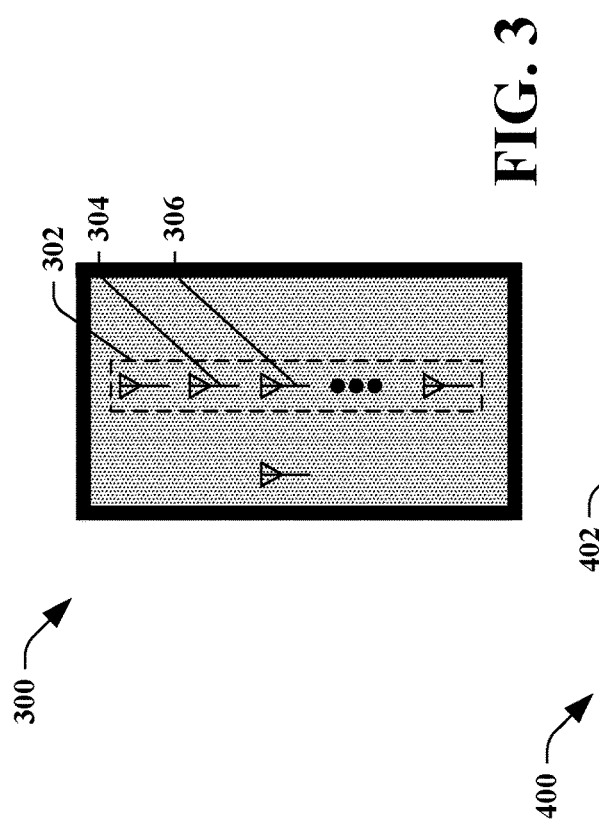
FIG. 3 is a head-on view of an exemplary antenna array.

The radar analysis component 110 can determine an elevation angle to the point 216 by employing AOA techniques between radar returns received at different antennas of the antenna array 102. Referring now to FIG. 3, an exemplary radar antenna array 300 is shown. The radar antenna array 300 can be or be included in the antenna array 102. The antenna array 300 includes a plurality of n antennas 302 that are vertically aligned, where n is an integer greater than 1. In exemplary embodiments, the plurality of antennas 302 can include 8 or more antennas, 16 or more antennas, or 32 or more antennas. Thus, the antenna array 300 includes a first antenna 304 and a second antenna 306 wherein the antennas 304, 306 are vertically aligned but positioned at different heights. In exemplary embodiments, a number of the antennas 302 can be selected to provide a desired FOV in the elevation direction. For example, the number of the antennas 302 can be selected such that the FOV in the elevation direction is greater than or equal to 30°, greater than or equal to 45°, or greater than or equal to 60°.

Due to the height difference between the antennas 304, 306, a radar return arrives at the antennas 304, 306 at different times, depending on the elevation of the point from which the radar return is received. Referring once again to FIGS. 1 and 2, the radar analysis component 110 can be configured to determine an elevation angle of the point 216 with respect to the antenna array 102 based upon TDOA between a first antenna in the array 102 and a second antenna in the array 102 that is positioned at a different height than the first antenna. The radar analysis component 110 can compute a TDOA of a return from the point 216 between the first antenna and the second antenna based upon the radar data associated with each of the first antenna and the second antenna. The radar analysis component 110 can then compute an elevation angle of the point based upon the computed TDOA.

Collectively, the range, azimuth angle, and elevation angle of the point 216 computed by the radar analysis component 110 define three-dimensional coordinates of the point 216. The radar analysis component 110 can output these coordinates to the computing system 106.

The computing system 106 includes a processor 114, memory 116, and a data store 118. The data store 118 stores mapping data 119 that include a plurality of points that are representative of positions of surfaces of objects in an operational region of the mapping vehicle 100. Collectively, these mapping data 119 define a three-dimensional map of the operating region of the vehicle 100. The memory 116 stores instructions that are executed by the processor 114. In particular, the memory 116 includes a mapping component 120 that is configured to generate and/or update the mapping data 119 based upon data received from the radar analysis component 110. The mapping component 120 is configured to receive three-dimensional coordinates of a point in the driving environment as identified by the radar analysis component 110 (e.g., as described above). The mapping component 120 is configured to update the mapping data 119 to include the point. Prior to updating the mapping data 119 to include the point, the mapping component 120 can execute a transform to transform the range, azimuth, and elevation coordinates of the point to a different coordinate system such as, but not limited to, [latitude, longitude, height above ground]. Hence, as the mapping vehicle traverses the operational region and the radar analysis component 110 identifies additional points in the operational region based upon radar returns received by the antenna array 102, the mapping component 120 updates the mapping data 119 with points representative of positions of objects in the operational region.

In various embodiments, it may be desirable for the vehicle 100 to exclude moving objects that are detected by the radar analysis component 110 from the mapping data 119. Moving objects, such as vehicles, pedestrians, bicyclists, etc., tend to be ephemeral and may not be present at the same location in the operational region at different times. By contrast, a static object such as a building is generally expected to be present at the same location over a long period of time (e.g., days, months, or years).

The radar analysis component 110 can distinguish between static objects and moving objects by comparing an azimuth angle $\phi$ for a point computed based upon the SAR principle (e.g., based upon Eq. 1) to an azimuth angle $\phi$ for the same point computed based upon AOA techniques. In general, the azimuth angle of a point on a moving object is not accurately computed by Eq. 1. Thus, if an azimuth angle of a point computed based upon the SAR principle conflicts with an azimuth angle of the same point computed based upon AOA techniques, the point can be inferred to represent a moving target. To identify moving targets in the driving environment of the vehicle 100, the radar analysis component 110 can be configured to compute, for a point in the driving environment, an azimuth angle $\phi_1$ based upon the SAR principle, and an azimuth angle $\phi_2$ based upon AOA techniques. If $\phi_1$ is not consistent with $\phi_2$, the radar analysis component 110 can exclude the point in question from inclusion in the mapping data 119, on the inference that the point is representative of a moving target. In various exemplary embodiments, the angles $\phi_1$ and $\phi_2$ are associated with some measure of uncertainty. For example, $\phi_1$ can be computed to a first value ±0.5° and $\phi_2$ can be computed to a second value ±3°. In such embodiments, the radar analysis component 110 can identify a conflict between $\phi_1$ and $\phi_2$ when the uncertainty bounds of the angles $\phi_1$ and $\phi_2$ do not overlap. Responsive to identifying a conflict between $\phi_1$ and $\phi_2$, the radar analysis component 110 can fail to output the associated point to the mapping component 120, and the point is not added to the mapping data 119.

In order to facilitate identifying the azimuth angle $\phi_2$ by AOA techniques, the antenna array 102 can include antennas that are horizontally offset from one another. By way of example, and referring again to FIG. 3, the array 300 can include an additional antenna 308 that is offset from the vertically-aligned plurality of antennas 302. In various embodiments, the additional antenna 308 can be horizontally aligned with one of the plurality of antennas 302 (e.g., the antenna 306 as shown in FIG. 3). Due to the horizontal offset of the additional antenna 308 from the plurality of antennas 302, an azimuth angle of a point can be determined using AOA techniques based upon radar returns of the additional antenna 308 and its horizontally aligned antenna 306.

Figure 4:
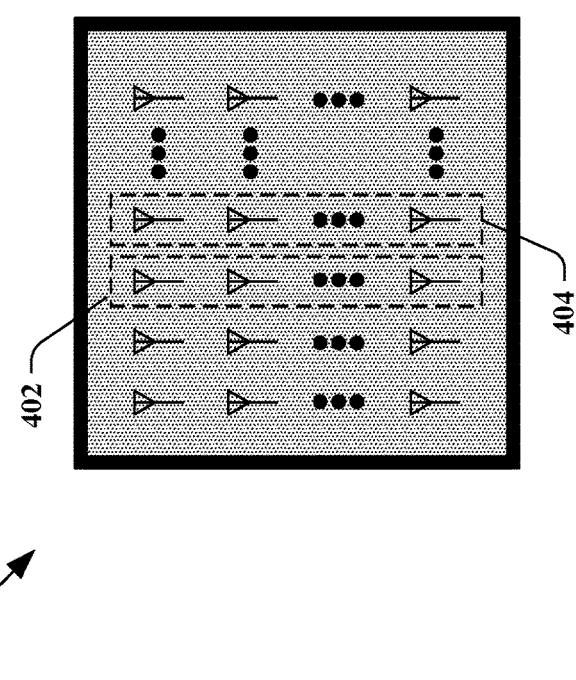
FIG. 4 is a head-on view of another exemplary antenna array.

Referring now to FIG. 4, another exemplary antenna array 400 is shown, wherein the array 400 is a two-dimensional array that includes a plurality of antennas arranged in/rows by m columns, where/and m are positive integers. For instance, the array 400 can include a first column of vertically aligned antennas 402 and a second column of vertically aligned antennas 404 that are horizontally offset from the first column of vertically aligned antennas 402. In exemplary embodiments, the radar analysis component 110 can compute an azimuth angle of a point using AOA techniques based upon radar returns of an antenna selected from the first column 402 and a corresponding horizontally aligned antenna from the second column 404.

Figure 5:
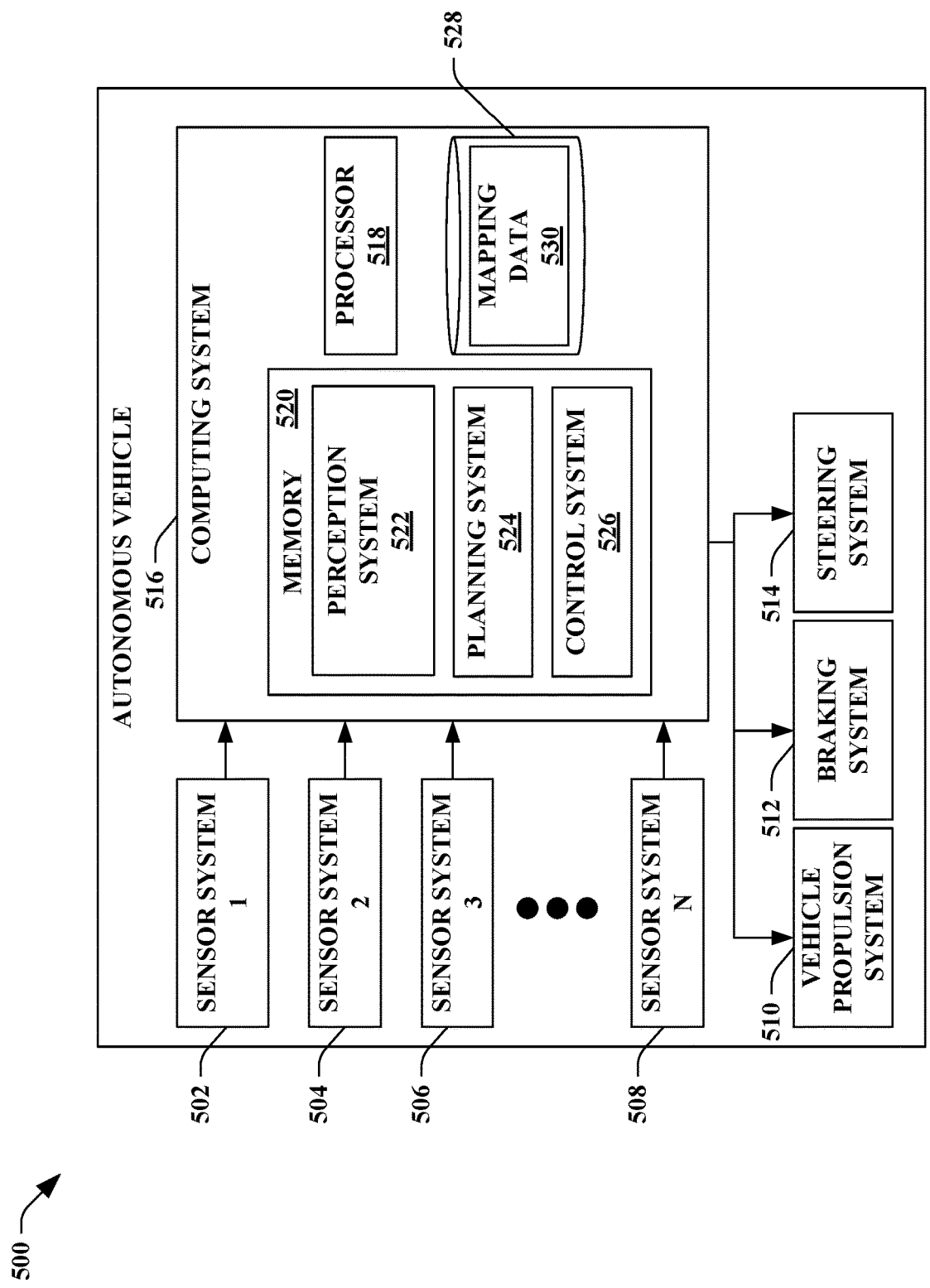
FIG. 5 is a functional block diagram of an exemplary AV that is configured to navigate about its driving environment based upon mapping data.

The mapping data 119 can be employed by an AV in connection with the AV navigating through its driving environment in the operational region represented by the mapping data 119. Referring now to FIG. 5, an exemplary AV 500 is shown. The AV 500 can navigate about roadways without human conduction based upon sensor signals output by sensor systems of the AV 500. The AV 500 includes a plurality of sensor systems 502-508 (a first sensor system 502 through an Nth sensor system 508). The sensor systems 502-508 may be of different types. For example, the first sensor system 502 may be a radar sensor system, the second sensor system 504 may be a lidar sensor system, the third sensor system 506 may be a camera (image) system, and the Nth sensor system 508 may be a sonar system. Other exemplary sensor systems include GPS sensor systems, inertial sensor systems, infrared sensor systems, and the like. The various sensor systems 502-508 are arranged about the AV 500. The sensor systems 502-508 are configured to repeatedly (e.g. continuously, or periodically) output sensor data that is representative of objects and conditions in the driving environment of the AV 500.

The AV 500 further includes several mechanical systems that are used to effectuate appropriate motion of the AV 500. For instance, the mechanical systems can include but are not limited to, a vehicle propulsion system 510, a braking system 512, and a steering system 514. The vehicle propulsion system 510 may be an electric engine, an internal combustion engine, or a combination thereof. The braking system 512 can include an engine brake, brake pads, actuators, a regenerative braking system, and/or any other suitable componentry that is configured to assist in decelerating the AV 500. The steering system 514 includes suitable componentry that is configured to control the direction of movement of the AV 500.

The AV 500 additionally comprises a computing system 516 that is in communication with the sensor systems 502-508 and is further in communication with the vehicle propulsion system 510, the braking system 512, and the steering system 514. The computing system 516 includes a processor 518 and memory 520 that includes computer-executable instructions that are executed by the processor 518. In an example, the processor 518 can be or include a graphics processing unit (GPU), a plurality of GPUs, a central processing unit (CPU), a plurality of CPUs, an application-specific integrated circuit (ASIC), a microcontroller, a programmable logic controller (PLC), a field programmable gate array (FPGA), or the like.

The memory 520 comprises a perception system 522, a planning system 524, and a control system 526. Briefly, the perception system 522 is configured to identify the presence of objects and/or characteristics of objects in the driving environment of the AV 500. The planning system 524 is configured to plan a route and/or a maneuver of the AV 500 based upon data pertaining to objects in the driving environment that are output by the perception system 522. The control system 526 is configured to control the mechanical systems 510-514 of the AV 500 to effectuate appropriate motion to cause the AV 500 to execute a maneuver planned by the planning system 524.

The perception system 522 is configured to identify objects (in proximity to the AV 500) captured in sensor signals output by the sensor systems 502-508. By way of example, the perception system 522 can be configured to identify the presence of an object in the driving environment of the AV 500 based upon images generated by a camera system included in the sensor systems 502-508. In another example, the perception system 522 can be configured to determine a range to an object in the driving environment of the AV 500, a three-dimensional position of the object, or a radar cross-section of the object, based upon radar returns received by a radar sensor included in the sensor systems 502-508.

The AV 500 can further include a data store 528 that stores mapping data 530. In exemplary embodiments, the mapping data 530 can include the mapping data 119 generated by the mapping vehicle 100. In still further embodiments, the mapping data 530 can include a map of navigable roadways in an operational region of the AV 500. In connection with the AV 500 navigating through its driving environment, the perception system 522 of the AV 500 can be configured to employ the mapping data 530 in connection with identifying objects and/or their properties. In a non-limiting example, the perception system 522 can be configured to identify an object in lidar data based upon a three-dimensional map of the driving environment included in the mapping data 530. For instance, if the three-dimensional map fails to include an object at a location for which the lidar data indicates the presence of an object, the perception system 522 can determine that a potentially mobile object is likely present at that location. The planning system 524 and the control system 526 can then plan and execute a maneuver for the AV 500, respectively, wherein the maneuver is based upon the likely presence of the potentially mobile object.

Figure 6:
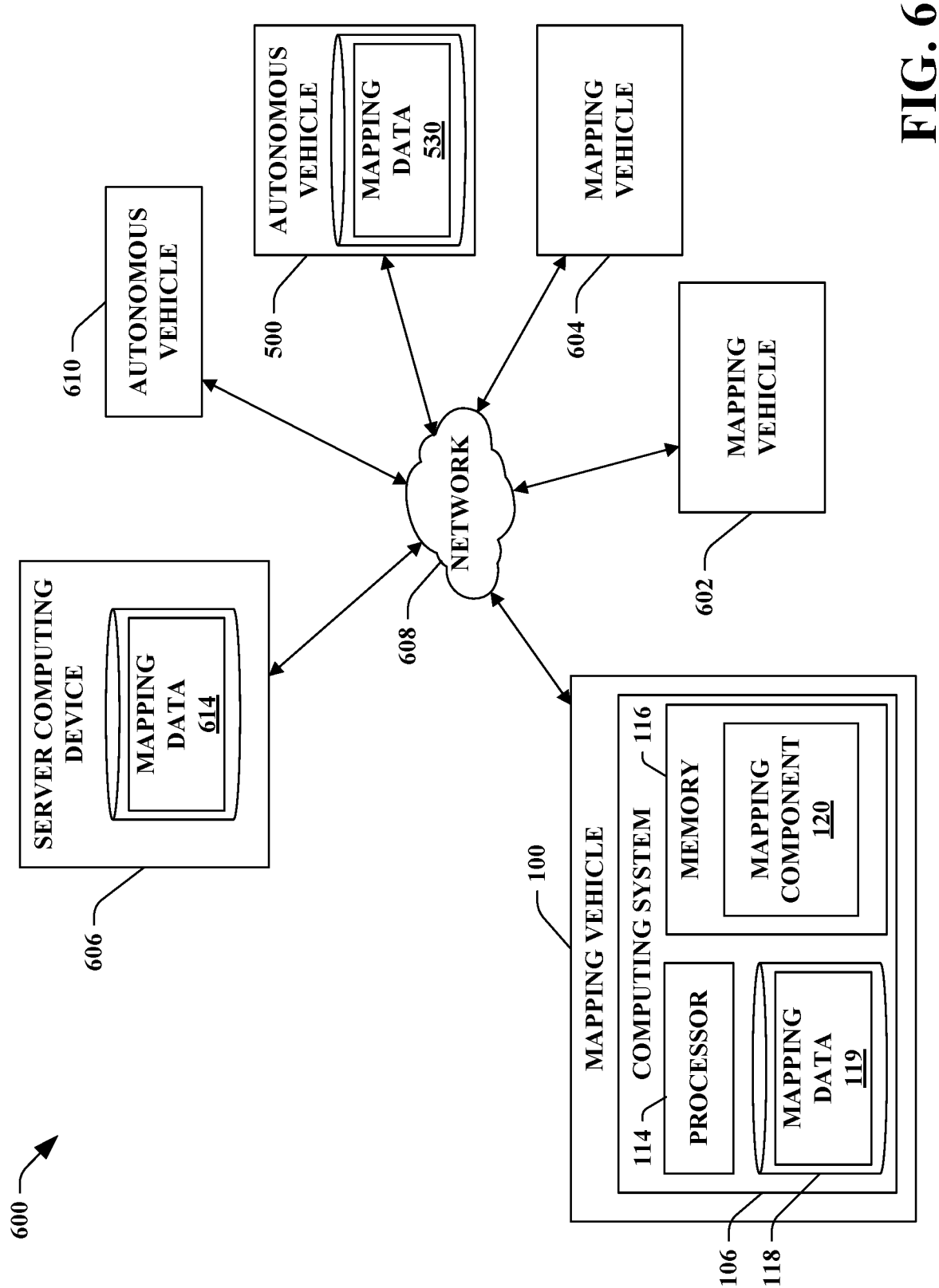
FIG. 6 is a functional block diagram of an exemplary system for updating and disseminating mapping data.

Referring now to FIG. 6, an exemplary system 600 that facilitates aggregating mapping data from a fleet of mapping vehicles and disseminating the mapping data to a fleet of AVs. The system 600 includes the mapping vehicle 100 and a plurality of additional mapping vehicles 602, 604. The system 600 further includes a server computing device 606 that is in communication with the mapping vehicles 100, 602, 604 by way of a network 608. The system 600 still further includes the AV and one or more additional AVs 610 that are in communication with the server computing device 606 by way of the network 608. The server computing device 606 receives mapping data from each of the mapping vehicles 100, 602, 604 by way of the network 608. The mapping vehicle 100 generates the mapping data 119 as described above. The mapping vehicles 602, 604 can be configured to traverse different portions of an operational region of the mapping vehicles 100, 602, 604 than the mapping vehicle 100. Further, the mapping vehicles 602, 604 can be configured to generate mapping data pertaining to their respective driving environments based upon radar data, as described above with respect to the mapping vehicle 100. In other embodiments, one or more of the additional mapping vehicles can be configured to generate mapping data based upon lidar data generated by lidar sensors (not shown) mounted on board the mapping vehicles 602, 604.

The server computing device 606 includes a data store 612 that stores mapping data 614 that pertains to an entire operational region of the mapping vehicles 100, 602, 604 and/or the AVs 500, 610. The server computing device 606 receives mapping data from each of the mapping vehicles 100, 602, 604, and updates the mapping data 614. Thus, as the mapping vehicles 100, 602, 604 traverse their respective portions of the operational region, the mapping data 614 is updated with new information. The mapping vehicles 100, 602, 604 can be configured to transmit updated mapping data to the server computing device 606 periodically as the vehicles 100, 602, 604 traverse their respective portions of the operational region. In other embodiments, the mapping vehicles 100, 602, 604 can be configured to provide mapping data updates to the server computing device 606 in a single bulk update upon completion of a traversal of a portion of the operational region.

The server computing device 606 is configured to transmit the mapping data 614 to the AVs 500, 610 for use by the AVs 500, 610 in navigating through the operational region represented by the mapping data 614. In some embodiments, the server computing device 606 can transmit the mapping data 614 to the AVs 500, 610 while the AVs 500, 610 are operating in the operational region. In other embodiments, the server computing device 606 can transmit the mapping data 614 to the AVs 500, 610 during down-time of the AVs 500, 610 (e.g., when the AVs 500, 610 are out of operation for maintenance or refueling).

Figure 7:
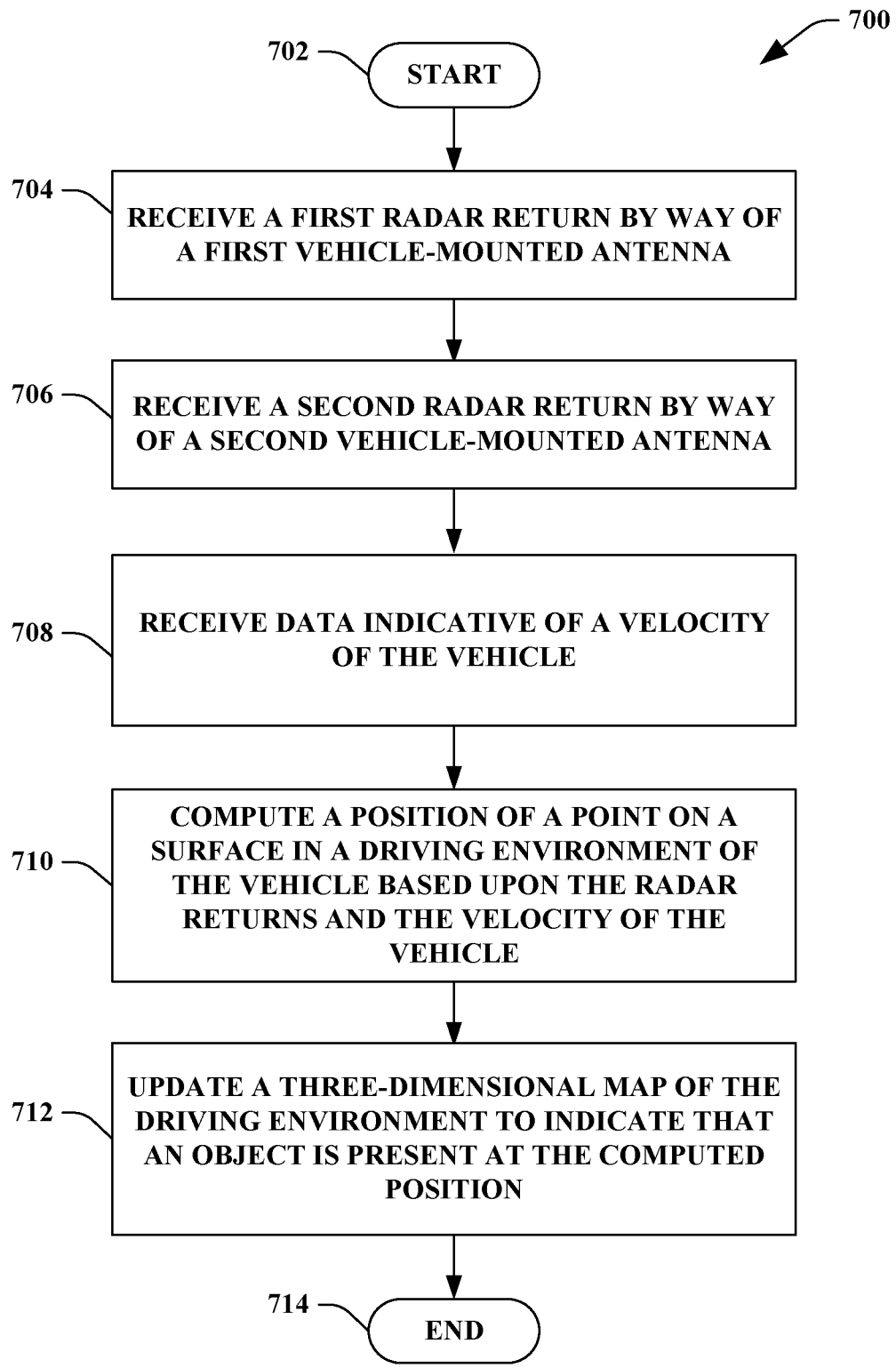
FIG. 7 is an exemplary methodology for generating a three-dimensional map of a driving environment of a vehicle based upon radar returns.

FIG. 7 illustrates an exemplary methodology 700 relating to generating mapping data pertaining to a driving environment of a vehicle based upon radar data by employing SAR principles. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement the methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 7, the exemplary methodology 700 for generating three-dimensional mapping data is illustrated. The methodology 700 starts at 702, and at 704 a first radar return is received from a first antenna mounted on a vehicle. The first vehicle-mounted antenna can be included in an array of antennas. At 706, a second radar return is received from a second antenna mounted on the vehicle. In exemplary embodiments, the second vehicle-mounted antenna can be included in a same array of antennas as the first vehicle-mounted antenna. At 708, data indicative of a velocity of the vehicle is received. For example, odometer data indicative of a distance traveled by the vehicle over a period of time can be received. In other embodiments, a velocity of the vehicle can be directly read out from a speedometer mounted on the vehicle. At 710, a position of a point on a surface in the driving environment of the vehicle is computed based upon the radar returns received by the first and second radar antennas at 704 and 706, respectively, and the velocity of the vehicle received at 708.

By way of example, and not limitation, a radial velocity of the point relative to the first radar antenna can be computed based upon the first radar return. Employing the SAR principle, n azimuth angle of the point can be determined based upon the radial velocity and the velocity of the vehicle. Continuing the example, an elevation angle of the point can be determined based upon the first radar return and the second radar return by employing AOA techniques. Continuing the example further, a range from the first radar antenna to the point can be determined based upon the first radar return. In a non-limiting example, the range can be determined based upon a frequency difference between the first radar return and a reference signal (e.g., in embodiments wherein the radar antennas are configured for FMCW operation).

At 712, a three-dimensional map of the driving environment of the vehicle is updated to indicate that an object is present at the position of the point computed at 710. The methodology 700 ends at 714.

Figure 8:
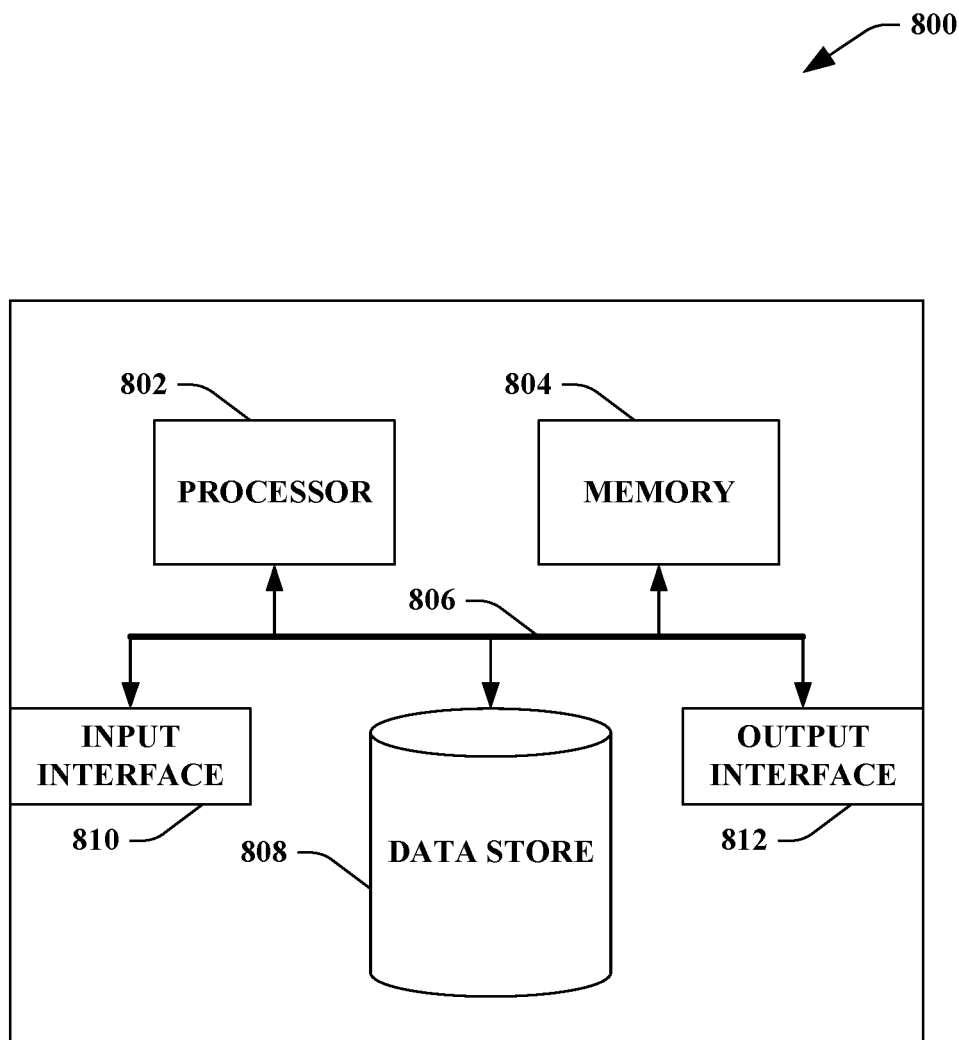
FIG. 8 is an exemplary computing system.

Referring now to FIG. 8, a high-level illustration of an exemplary computing device 800 that can be used in accordance with the systems and methodologies disclosed herein is illustrated. For instance, the computing device 800 may be or include the computing systems 106 or 516. The computing device 800 includes at least one processor 802 that executes instructions that are stored in a memory 804. The instructions may be, for instance, instructions for implementing functionality described as being carried out by one or more modules, components, or systems discussed above or instructions for implementing one or more of the methods described above. The processor 802 may be a GPU, a plurality of GPUs, a CPU, a plurality of CPUs, a multi-core processor, etc. The processor 802 may access the memory 804 by way of a system bus 806. In addition to storing executable instructions, the memory 804 may also store radar data, velocity data, etc.

The computing device 800 additionally includes a data store 808 that is accessible by the processor 802 by way of the system bus 806. The data store 808 may include executable instructions, sensor data, radar data, velocity data, mapping data, etc. The computing device 800 also includes an input interface 810 that allows external devices to communicate with the computing device 800. For instance, the input interface 810 may be used to receive instructions from an external computing device, etc. The computing device 800 also includes an output interface 812 that interfaces the computing device 800 with one or more external devices. For example, the computing device 800 may transmit control signals to the vehicle propulsion system 510, the braking system 512, and/or the steering system 514 by way of the output interface 812.

Additionally, while illustrated as a single system, it is to be understood that the computing device 800 may be a distributed system. Thus, for instance, several devices may be in communication by way of a network connection and may collectively perform tasks described as being performed by the computing device 800.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include FPGAs, ASICs, Application-specific Standard Products (ASSPs), System-on-a-chip systems (SOCs), Complex Programmable Logic Devices (CPLDs), etc.

The features described herein relate to systems and methods for generating a three-dimensional map of a region based upon output of a radar sensor, and operating an AV within the region based upon the three-dimensional map according to at least the examples provided below:

(A1) In one aspect, some embodiments include a vehicle, where the vehicle includes a radar antenna array that receives radar returns from a driving environment of the vehicle, wherein the radar antenna array has an FOV pointed in a direction that is offset at an angle from a direction of travel of the vehicle. The vehicle further includes a hardware logic component that receives radar data that is indicative of the radar returns received by the radar antenna array over a period of time and generates a three-dimensional point cloud based upon the radar data through use of SAR techniques. Use of the SAR techniques comprises computing, based upon the radar data and a velocity of the vehicle during the period of time, a position of a point on a surface of an object in the driving environment. Use of the SAR techniques further includes updating a three-dimensional map of the driving environment of the vehicle based upon the computed position such that the three-dimensional map indicates that an object is present at the computed position.

(A2) In some embodiments of the vehicle of (A1) computing the position of the point comprises computing an azimuth angle of the point relative to a center of the FOV of the antenna array.

(A3) In some embodiments of the vehicle of (A2) computing the azimuth angle comprises computing, based upon the radar data, a radial velocity of the point with respect to the radar antenna array; and computing the azimuth angle based upon the velocity of the vehicle and the radial velocity of the point with respect to the radar antenna array.

(A4) In some embodiments of the vehicle of at least one of (A1)-(A2) computing the position of the point comprises computing an elevation angle of the point relative to the center of the FOV of the radar antenna array; and computing a range of the point relative to the radar antenna array.

(A5) In some embodiments of the vehicle of (A4) computing the position of the point further comprises transforming the range, elevation angle, and azimuth angle of the point to an absolute coordinate system.

(A6) In some embodiments of the vehicle of at least one of (A1)-(A5), the radar antenna array comprises a plurality of vertically aligned antennas.

(A7) In some embodiments of the vehicle of (A6), the plurality of vertically aligned antennas includes at least 8 antennas.

(A8) In some embodiments of the vehicle of at least one of (A1)-(A8), the radar antenna array includes a first antenna, and the vehicle further comprises a second radar antenna that is not included in the radar antenna array. In such embodiments, the second radar antenna is horizontally offset from the first antenna, and the hardware logic component is further configured to perform various additional acts. The acts include computing, based upon the radar data and the velocity of the vehicle during the period of time, a position of a second point in the driving environment. The acts further include computing, based upon a portion of the radar data representative of a radar return received by the first radar antenna and second radar data that is indicative of a radar return received by the second radar antenna, a position of a third point in the driving environment. Still further the acts include determining that the second point and the third point are representative of a moving object in the driving environment, and responsive to determining that the second point and the third point are representative of the moving object, failing to include the second point and the third point in the three-dimensional map of the driving environment.

(A9) In some embodiments of the vehicle of at least one of (A1)-(A8), the FOV of the radar antenna array is pointed in a direction orthogonal to the direction of travel of the vehicle.

(A10) In some embodiments of the vehicle of at least one of (A1)-(A9) the radar antenna array is configured for FMCW operation.

(A11) In some embodiments of the vehicle of at least one of (A1)-(A10), the velocity of the vehicle employed by the hardware logic component in connection with computing the position of the point is a velocity indicated by one of a speedometer of the vehicle or an odometer of the vehicle.

(A12) In some embodiments of the vehicle of at least one of (A1)-(A11), the velocity of the vehicle during the period of time is greater than or equal to 10 miles per hour.

(B1) In another aspect, some embodiments include a system that includes a first vehicle and a second vehicle. The first vehicle comprises a radar antenna that receives radar returns from a driving environment of the first vehicle. The first vehicle further includes a hardware logic component that receives radar data that is indicative of the radar returns received by the radar antenna, wherein the hardware logic component employs SAR techniques to generate a point cloud that is representative of the driving environment of the first vehicle. Employing the SAR techniques comprises computing, based upon the radar data and a velocity of the vehicle during the period of time, a position of a point on a surface of an object in the driving environment. Employing the SAR techniques further includes updating, based upon the computed position, mapping data that pertains to an operational region of a fleet of AVs, the operational region including the driving environment of the first vehicle. The mapping data is updated such that the mapping data indicates that an object is present at the computed position. The second vehicle is an AV in the fleet of AVs. The second vehicle includes a computing system, wherein the computing system is configured to control operation of the AV based upon the mapping data.

(B2) In some embodiments of the system of (B1) the system further comprises a server computing device that is in network communication with the first vehicle and the second vehicle, wherein the server computing device maintains a three-dimensional map of the operational region of the AV, the first vehicle is configured to transmit the mapping data to the server computing device, and responsive to receipt of the mapping data the server computing device updates the three-dimensional map of the operational region to indicate that the object is present at the computed position.

(B3) In some embodiments of the system of (B2), the server computing device is further configured to transmit the mapping data to the second vehicle.

(C1) In another aspect, some embodiments include a method that comprises receiving a first radar return by way of a first radar antenna mounted on a vehicle. The method further comprises receiving a second radar return by way of a second radar antenna mounted on the vehicle. The method further includes receiving data indicative of a velocity of the vehicle. Still further, the method includes computing, based upon the first radar return, the second radar return, and the velocity of the vehicle, a position of a point on a surface of an object in a driving environment of the vehicle. Computing the position of the point on the surface of the object comprises computing an azimuth angle of the point relative to a center of an FOV of the first radar antenna based upon the first radar return and the velocity of the vehicle. The method additionally includes updating a three-dimensional map of the driving environment of the vehicle such that the three-dimensional map of the driving environment indicates that an object is present at the computed position.

(C2) In some embodiments of the method of (C1), computing the position of the point further comprises computing an elevation angle of the point based upon the first radar return and the second radar return.

(C3) In some embodiments of the method of at least one of (C1)-(C2) computing the position of the point further comprises computing a range to the point based upon the first radar return.

(C4) In some embodiments of the method of (C3), computing the range to the point based upon the first radar return comprises computing a frequency difference between the first radar return and a reference signal, wherein the frequency difference is indicative of the range.

(C5) In some embodiments of the method of at least one of (C1)-(C4), the method further includes receiving a third radar return by way of a third radar antenna mounted on the vehicle, the third radar antenna offset from the first radar antenna along a direction of travel of the vehicle. In such embodiments, the method also includes determining that a second point is representative of a surface of a moving object based upon the first radar return, the velocity of the vehicle, and the third radar return. In such embodiments, the method additionally includes responsive to determining that the second point is representative of a surface of a moving object, failing to update the three-dimensional map of the driving environment to include the second point.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A vehicle comprising:
   a radar antenna array configured to receive radar returns from a driving environment of the vehicle, wherein the radar antenna array has a field-of-view (FOV) pointed in a direction that is offset at an angle from a direction of travel of the vehicle, wherein the radar antenna array includes a first radar antenna;
   a second radar antenna that is not included in the radar antenna array, wherein the second radar antenna is horizontally offset from the first antenna; and
   a hardware logic component configured to receive radar data that is indicative of the radar returns received by the radar antenna array over a period of time and generate a three-dimensional point cloud based upon the radar data through use of synthetic aperture radar (SAR) techniques, wherein use of the SAR techniques comprises:
   computing, based upon the radar data and a velocity of the vehicle during the period of time, a position of a point on a surface of an object in the driving environment; and
   updating a three-dimensional map of the driving environment based upon the computed position such that the three-dimensional map indicates that an object is present at the computed position;
   computing, based upon the radar data and the velocity of the vehicle during the period of time, a position of a second point in the driving environment;
   computing, based upon a portion of the radar data representative of a radar return received by the first radar antenna and second radar data that is indicative of a radar return received by the second radar antenna, a position of a third point in the driving environment;
   determining that the second point and the third point are representative of a moving object in the driving environment; and
   responsive to determining that the second point and the third point are representative of the moving object, failing to include the second point and the third point in the three-dimensional map of the driving environment.

2. The vehicle of claim 1, wherein computing the position of the point comprises computing an azimuth angle of the point relative to a center of the FOV of the antenna array.

3. The vehicle of claim 2, wherein computing the azimuth angle comprises:
   computing, based upon the radar data, a radial velocity of the point with respect to the radar antenna array; and
   computing the azimuth angle based upon the velocity of the vehicle and the radial velocity of the point with respect to the radar antenna array.

4. The vehicle of claim 2, wherein computing the position of the point further comprises:
   computing an elevation angle of the point relative to the center of the FOV of the radar antenna array; and
   computing a range of the point relative to the radar antenna array.

5. The vehicle of claim 4, wherein computing the position of the point further comprises transforming the range, elevation angle, and azimuth angle of the point to an absolute coordinate system.

6. The vehicle of claim 1, wherein the radar antenna array comprises a plurality of vertically aligned antennas.

7. The vehicle of claim 6, wherein the plurality of vertically aligned antennas includes at least 8 antennas.

8. The vehicle of claim 1, wherein the FOV of the radar antenna array is pointed in a direction orthogonal to the direction of travel of the vehicle.

9. The vehicle of claim 1, wherein the radar antenna array is configured for frequency-modulated continuous wave (FMCW) operation.

10. The vehicle of claim 1, wherein the velocity of the vehicle employed by the hardware logic component in connection with computing the position of the point is a velocity indicated by one of a speedometer of the vehicle or an odometer of the vehicle.

11. The vehicle of claim 1, wherein the velocity of the vehicle during the period of time is greater than or equal to 10 miles per hour.

* * * * *